(12) United States Patent
Higuchi

(10) Patent No.: US 6,291,967 B1
(45) Date of Patent: Sep. 18, 2001

(54) BATTERY DISCRIMINATING METHOD, DRY CELL BATTERY PACK, AND ELECTRONIC DEVICE

(75) Inventor: Yoshinari Higuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/702,937

(22) Filed: Oct. 31, 2000

Related U.S. Application Data

(62) Division of application No. 08/788,195, filed on Jan. 24, 1997, now Pat. No. 6,154,004.

(30) Foreign Application Priority Data

Jan. 29, 1996 (JP) ........................................ 8-35522
Mar. 8, 1996 (JP) .................................. 8-080756

(51) Int. Cl.$^7$ ........................................... H02J 7/00
(52) U.S. Cl. .................................. 320/106; 320/DIG. 12
(58) Field of Search ........................... 320/106, DIG. 12, 320/165; 429/7, 178, 1

(56) References Cited

U.S. PATENT DOCUMENTS

| | | | |
|---|---|---|---|
| 4,628,243 | * 12/1986 | Hodgman et al. | 320/106 |
| 4,680,527 | * 7/1987 | Benenati et al. | 320/112 |
| 5,111,128 | * 5/1992 | Branan, Jr. et al. | 320/106 |
| 5,237,257 | * 8/1993 | Johnson et al. | 320/106 |
| 5,293,109 | * 3/1994 | Fischl et al. | 320/112 |
| 5,565,756 | * 10/1996 | Urbish et al. | 320/103 |
| 5,652,496 | * 7/1997 | Pilarzyk et al. | 320/106 |
| 5,850,134 | * 12/1998 | Oh et al. | 320/106 |
| 6,005,367 | * 12/1999 | Rohde | 320/106 |
| 6,154,004 | * 11/2000 | Higuchi | 320/106 |

FOREIGN PATENT DOCUMENTS

| | | |
|---|---|---|
| 0 394 074 | 10/1990 | (EP). |
| 2 239 567 | 7/1991 | (GB). |
| 2 251 515 | 7/1992 | (GB). |

* cited by examiner

Primary Examiner—Peter S. Wong
Assistant Examiner—Gregory J. Toatley, Jr.
(74) Attorney, Agent, or Firm—Frommer Lawrence & Haug LLP; William S. Frommer; Dennis M. Smid

(57) ABSTRACT

A battery discriminating method discriminates between smart battery packs and dry cell battery packs with a simple structure. A dry cell battery pack is composed of a case for storing a plurality of dry batteries connected in series, positive and negative electrodes which are provided in the case and connected to the series-connected dry batteries, and a resistance element of which one end is connected to the series-connected dry batteries and the other end is connected to a terminal provided in the case. A predetermined voltage is supplied to a terminal for discriminating the battery of a battery pack via a resistor, and the voltage value of this terminal is detected to discriminate the type of the battery pack according to the detected voltage value.

6 Claims, 4 Drawing Sheets

BATTERY DISCRIMINATING METHOD, DRY CELL BATTERY PACK, AND ELECTRONIC DEVICE

This application is a divisional of application Ser. No. 08/788,195 filed on Jan. 24, 1997 which is now U.S. Pat. No. 6,154,004.

BACKGROUND OF THE INVENTION

1. Field of the Invention

This invention relates to a battery discriminating method, dry cell battery pack, and electronic device, and more particularly, is applicable to a dry cell battery pack for supplying a direct current and an electronic device in which both this dry cell battery pack and a battery pack can be used.

2. Description of the Related Art

Nowadays, high-capacity battery packs storing battery cells such as a plurality of lithium-ion battery cells has been used to supply a direct current to electronic devices such as a portable personal computer, video camera, and portable telephone.

Such battery packs contain chargeable battery cells, thus they are very expensive. However, as electronic devices become smaller in size and achieve a larger saving in power consumption, inexpensive cell batteries come to be used in electronic devices which could be used only with charge-battery packs, hitherto. Battery packs become unusable if the battery becomes empty when used at the place he has gone to, because they have a charging system. Accordingly, the necessity to carry a plurality of charged battery packs occurs.

However, to buy a plurality of charged battery packs is economically burden some on the user because battery packs are expensive as described above. If electronic devices can be used with dry batteries, it is very convenient for the user since the user can buy dry batteries at a nearby store or the like and can start the use of an electronic device again.

In battery packs and dry cell battery packs usable in the same electronic devices, the structure of electrodes is the same naturally. Thus in this state, it is feared that a dry cell battery pack is fitted in a charger. Therefore, it is needed that a battery pack is made so as not to fit in a charger, or it is needed to prevent the charging that a charger discriminates that it is a dry cell battery pack if a dry cell battery pack is fitted in a charger. It is more convenient that dry cell battery packs and battery packs are discriminated not only by chargers but also in accordance with the specifications of electronic devices.

Heretofore, to discriminate battery packs from dry cell battery packs, for example, a concave part is provided on the side of a battery pack facing an electronic device but the concave part provided on the battery pack is not provided on the side of a dry cell battery pack facing the electronic device. Further, a push switch which can move up and down by means of a spring or the like is provided on a face for attaching a power source of the electronic device. When the battery pack is fitted to the electronic device, the push switch provided on the power source attaching part is connected with the concave part, so that this push switch is not pushed down. A microcomputer in the electronic device detects this state and determines that a battery pack is fitted thereto. On the other hand, when a dry cell battery pack is fitted to the electronic device, the push switch provided on the power source fitting part is pushed down by a flat part of a dry battery cell. The microcomputer in the electronic device detects this state and determines that a dry cell battery pack is fitted thereto. As the above, a plural sets of a push switch and a concave part are provided so that types of discriminatable power sources can be increased.

Recently, since microcomputers are low-cost, smart battery packs in which a microcomputer is built in a battery pack to perform communication with an electronic device appears. By using such smart battery packs, a remained capacity of the battery can be calculated correctly, and further, the quantity of charge is controlled to detect the life of battery and transmit it to an electronic device. The electronic device displays it on a display unit such as a liquid crystal panel of the electronic device.

By the way, the use of dry cell battery packs in the electronic devices which can use smart battery packs has been also considered so that electronic devices which can use both dry cell battery packs and battery packs comes to entry as described above. However, if a microcomputer is built in dry cell battery packs similar to smart battery packs, it becomes expensive; as a result, low-cost performance of dry cell battery packs, which is one of the advantages, cannot be realized.

Moreover, in the above-described method of discriminating between battery packs and dry cell battery packs, types of those packs are discriminated in the external form of battery packs and dry cell battery packs, therefore, it is needed that a push switch described above is provided on the battery fitting part of an electronic device; it suffers limitation on planning of electronic devices. Also, in the case where the reduction of the size of electronic devices is realized by providing a plurality of push switches to discriminate between plural types of batteries, a space between switches become narrow, so that error discrimination is apt likely to occur.

SUMMARY OF THE INVENTION

In view of the foregoing, an object of this invention is to provide a battery discriminating method in which the type of battery can be discriminated correctly with a simple structure, a dry cell battery pack which realizes low-cost performance, and an electronic device which can be reduced in size for discriminating the type of the battery.

The foregoing object and other objects of the invention have been achieved by the provision of a battery discriminating method, wherein a battery pack which has at least, first and second terminals corresponding to positive and negative electrodes and a third terminal, a predetermined voltage is supplied to the third terminal via a resistor, and the voltage value of the third terminal is detected to discriminate the type of the battery pack according to the detected voltage value.

Further, a dry cell battery pack is composed of a case for storing a plurality of dry batteries connected in series, positive and negative electrodes and terminals which are provided in this case and connected to the poles of the series-connected dry cell batteries, and a resistance element of which one end is connected to a predetermined connecting point of the series-connected dry cell batteries and the other end is connected to a terminal provided in the case.

Furthermore, an electronic device according to the present invention can be driven by plural types of battery packs each of which has at least, first and second terminals corresponding to positive and negative electrodes and a third terminal. The electronic device is composed of a means for supplying a predetermined voltage to the third terminal via a resistor, a means for detecting the voltage value of the third terminal, and a means for comparing the detected voltage value with a predetermined reference voltage, thereby, the electronic device discriminates the type of the battery pack according to the comparison result.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

Note that, the following embodiment will be described in the case of using a video camera as an electronic device, however, the present invention is not limited to this.

Figure 1:
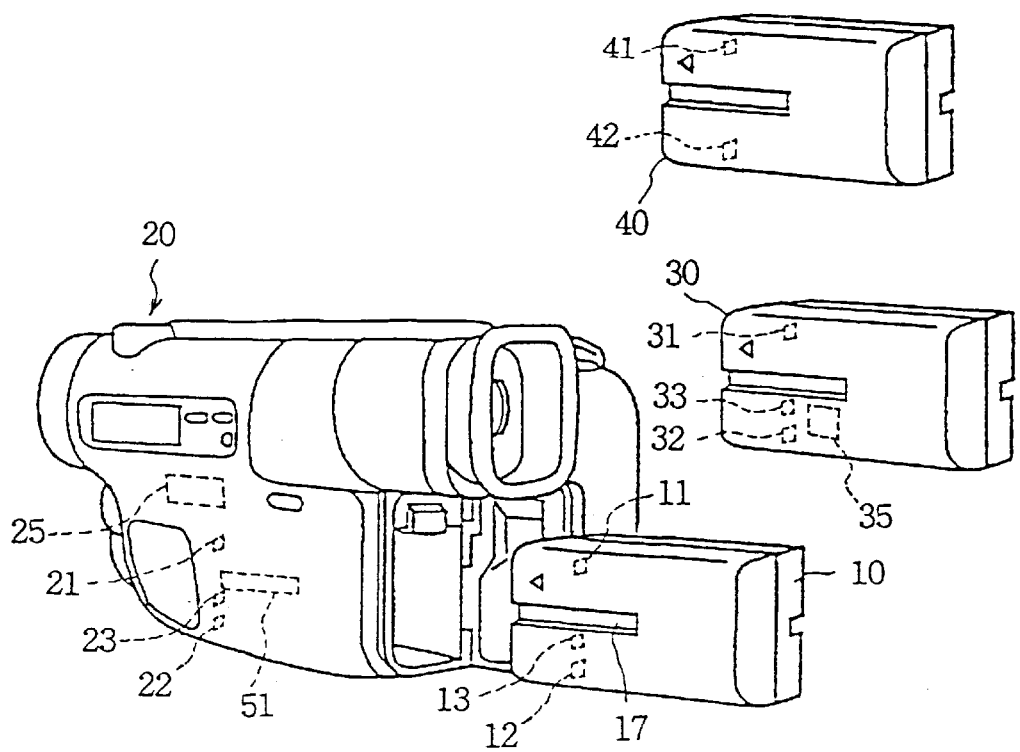
FIG. 1 is an external view showing a general structure according to the embodiment.

In FIG. 1, a reference numeral 10 denotes a dry cell battery pack in which a plurality of dry cell battery are stored, a reference numeral 20 denotes a-video camera in which a battery pack is to be inserted into the case from the outside, a reference numeral 30 is a smart battery pack in which a plurality of charge-battery cells and a microcomputer are contained, and a reference numeral 40 is a conventional battery pack.

In the dry cell battery pack 10, a positive electrode or terminal 11 and a negative electrode or terminal 12 are provided, so that when the dry cell battery pack 10 is fitted to the video camera 20, the terminals 11 and 12 of the dry cell battery pack are connected to electrodes or terminals 21 and 22 which are provided in a battery fitting part of the video camera 20. In this way, the dry cell battery pack 10 can supply a direct current to the video camera 20 through the terminals electrodes 11, 12, and the terminals 21, 22.

In addition, in the dry cell battery cell battery pack 10, a battery discriminating terminal 13 is provided, so that when the dry cell battery pack 10 is fitted to the video camera 20, the terminal 13 is connected to a terminal 23 of the battery fitting part. This terminal 13 is provided for battery discrimination.

In the smart battery pack 30, a positive electrode or terminal 31 and a negative electrode or terminal 32 are provided, so that when the smart battery pack 30 is fitted to the video camera 20, the terminals 31 and 32 of the smart battery pack are connected to the terminals 21 and 22, which are provided in the battery fitting part. In this way, the smart battery pack 30 can supply a direct current to the video camera 20 through the terminals 31, 32 and the terminals 21, 22.

In addition, in the smart battery pack 30, a battery discriminating terminal 33 is provided, so that when the smart battery pack 30 is fitted to the video camera 20, the terminal 33 is connected to the terminal 23 of the battery fitting part. This terminal 33 is connected to the microcomputer 35 contained in the smart battery pack 30 for communication to a microcomputer 25 contained in the video camera 20.

In the battery pack 40, a positive electrode or terminal 41 and a negative electrode or terminal 42 are provided, so that when the battery pack 40 is fitted to the video camera 20, the terminals 41 and 42 of the battery pack 40 are connected to the terminals 21 and 22 provided in the battery fitting part of the video camera 20. In this way, the battery pack 40 can supply a direct current to the video camera 20 through the terminals 41, 42, and the terminals 21, 22.

This battery pack 40 is one which has been used in conventional video cameras, and which has no terminal like the terminal 13 of the dry cell battery pack 10 and the terminal 33 of the smart battery pack.

In the battery fitting part of the video camera 20, the terminals 21 and 22 are provided, so that a direct current is supplied from any of the dry battery cell pack 10, the smart battery pack 30, and the battery pack 40. The terminal 23 provided in the battery fitting part is used as a discriminating terminal for discriminating that either battery of the dry cell battery pack 10 or the smart battery pack 30 has been fitted and also as a communication terminal between the microcomputer 35 contained in the smart battery pack and the microcomputer 25 contained in the video camera 20. Note that, FIG. 1 shows an example in which the dry cell battery pack 10, the smart battery pack 30, and the battery pack 40 are fitted by way of inserting in the case of the video camera 20, but it may be a type attaching to the video camera.

Figure 2:
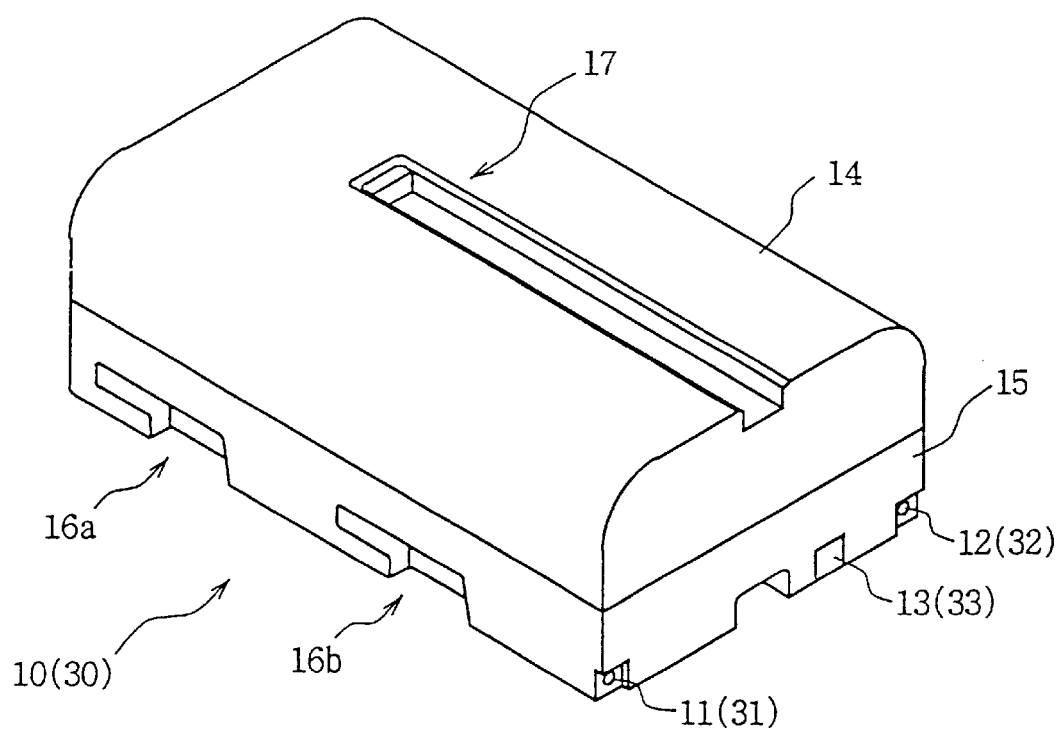
FIG. 2 is an external view showing the outline of a smart battery pack and a dry cell battery pack.

FIG. 2 is a perspective view showing the outside view of the dry cell battery pack 10 and the smart battery pack 30. Here, it is described assuming that the external structure of the cases of the dry cell battery pack 10 and the smart battery pack 30 (hereinafter, they are called the battery pack 10 (30) lumping them together) are the same. The battery pack 10 (30) is composed of an upper case part 14 and a lower case part 15. On the upper case part 14, a reverse-insertion preventing groove 17 is provided. As shown in FIG. 1, in the video camera in which the battery pack 10 (30) is fitted by way of inserting in the case of the video camera 20, a reverse-insertion preventing rib 51 which corresponds to the reverse-insertion preventing groove 17 of the battery pack 10 (30) is provided. This combination of the reverse-insertion preventing groove 17 and the reverse-insertion preventing rib 51 prevents the battery pack 10 (30) from being inserted in the reverse direction.

In FIG. 2, connecting grooves 16a and 16b are provided on the side of the lower case part 15 of the battery pack 10 (30) and similar connecting grooves 16c and 16d, which are not shown, are provided on the side at the back. If the battery pack 10 (30) is attached to the attach-type video camera, these connecting grooves are connected with connecting projections which are provided in the battery fitting part of the video camera, and a locking projection of the battery fitting part of the video camera is connected with a locking concave part, which is not shown, on the bottom of the battery pack 10 (30): thus the fitting state is kept.

On the front in the insert direction of the lower case part 15 of the battery pack 10 (30), the terminals 11 (31) and 12 (32) are provided at both ends and the terminal 13 (33) is provided at the center. Note that, the external structure of the case of the conventional battery pack 40 is the same except that the terminal 13 (33) is not provided therein.

In the embodiment shown in FIG. 1, to simplify the explanation, the dry cell battery pack 10 and the smart battery pack 30 are made the same in the external structure, however, those may be different in shape and size.

However, at least, these must be the same: the structure of the terminals 11 (31) and 12 (32) of the lower case part 15 and the terminal 13 (33) and the positional relation to keep the interchange characteristic between the battery pack 10 and the smart battery pack 30. More specifically, in the case where the size of the dry cell battery pack 10 and the smart battery pack 30 are changed, the size of the upper case part 14 should be changed as these are the same in the structure of the terminals 11 (31) and 12 (32) of the lower case part 15 and the terminal 13 (33). However, in the case where two battery packs 10 (30) which are different in size as the above are fitted to a video camera of the type of inserting the battery pack 10 (30) in the case, it is needed to consider the structure of a battery fitting part.

Figure 3:
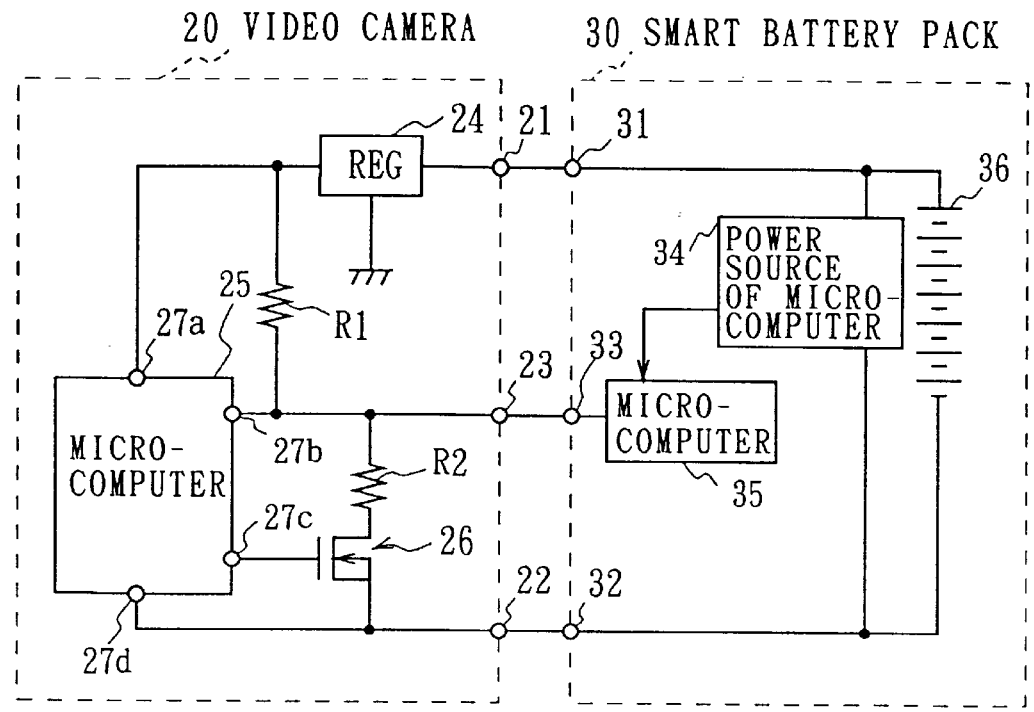
FIG. 3 is a block diagram showing the internal structure of the smart battery pack and an electronic device.

FIG. 3 shows the state where the smart battery pack 30 is fitted to the video camera 20. The smart battery pack 30 is composed of a plurality of chargeable battery cells 36 which are connected between the terminals 31 and 32, a microcomputer 35, and a power circuit 34 for the microcomputer. The power circuit 34 generates operating voltage for the microcomputer 35 from the terminal voltage of the battery cells 36 to supply it to the microcomputer 35. The microcomputer 35 communicates with an electronic device 20 via a terminal 33.

The video camera 20 is composed of a voltage regulator 24, a microcomputer 25 for controlling the video camera 20, a field effect transistor (FET) 26, a pull-up resistor R1 having extremely high resistance value, and a voltage-dividing resistor R2. The positive terminal 31 of the smart battery pack 30 is connected to the terminal 21 provide constant voltage by the voltage regulator 24. The constant voltage is supplied to a terminal 27a of the microcomputer 25. On the other hand, the negative terminal 32 of the smart battery pack 30 is connected to a terminal 27d of the microcomputer 25 via the terminal 22. The microcomputer 25 inputs signal from the terminal 23 to a detecting-voltage input terminal 27b. One end of the FET 26 is connected to the line between the terminal 22 and the terminal 27d, and the other end is connected to the line between the terminal 23 and the detecting-voltage input terminal 27b via the resistor R2. Furthermore, a gate terminal of the FET 26 is connected to a communication output terminal 27c of the microcomputer 25.

Figure 4:
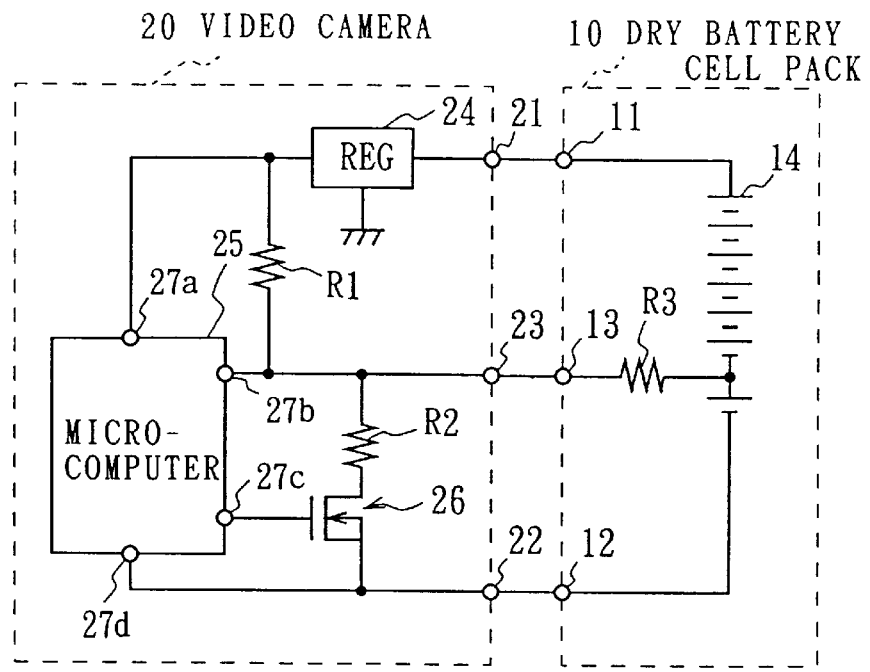
FIG. 4 is a block diagram showing the internal structure of the dry cell battery pack and the electronic device.

FIG. 4 shows the state where the dry cell battery pack 10 is fitted to the video camera 20. The dry cell battery pack 10 is composed of a plurality of dry cells 14 which are connected in series between the terminals 11 and 12, and a voltage-dividing resistor R3. One end of the voltage-dividing resistor R3 is connected to a positive pole of the first dry cell of those six dry cells, and the other end is connected to a battery discriminating terminal 13. An explanation of the structure of the video camera 20 is omitted because it is the same as that of FIG. 3. Here, it is assumed that the voltage-dividing resistor R2 included in the video camera 20 and the voltage-dividing resistor R3 included in the dry cell battery pack 10 are the same in resistance value to simplify the description, but the present invention is not limited to this.

Figure 5:
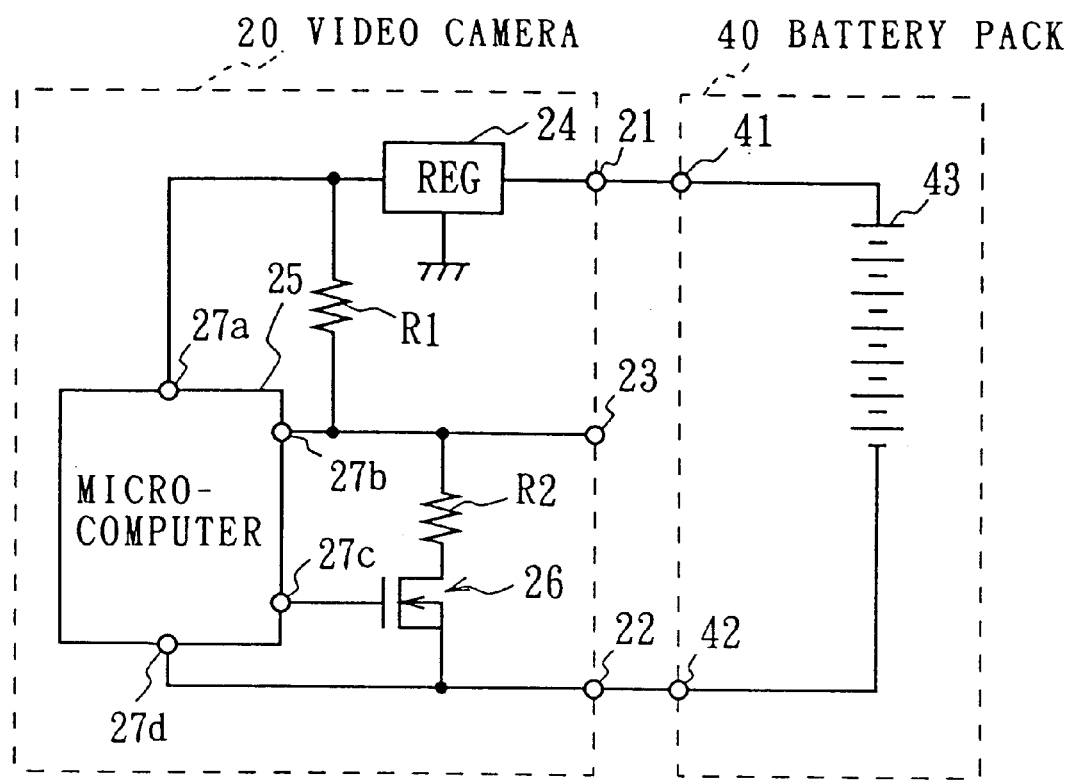
FIG. 5 is a block diagram showing the internal structure of the battery pack and the electronic device.

FIG. 5 shows the state where the battery pack 40 is fitted to the video camera 20. The battery pack 40 is composed of a plurality of battery cells 43 which are connected in series between terminals 41 and 42. Nothing is connected to the terminal 23 of the video camera 20 because the battery pack 40 has no terminal for communication and battery discrimination.

Figure 6:
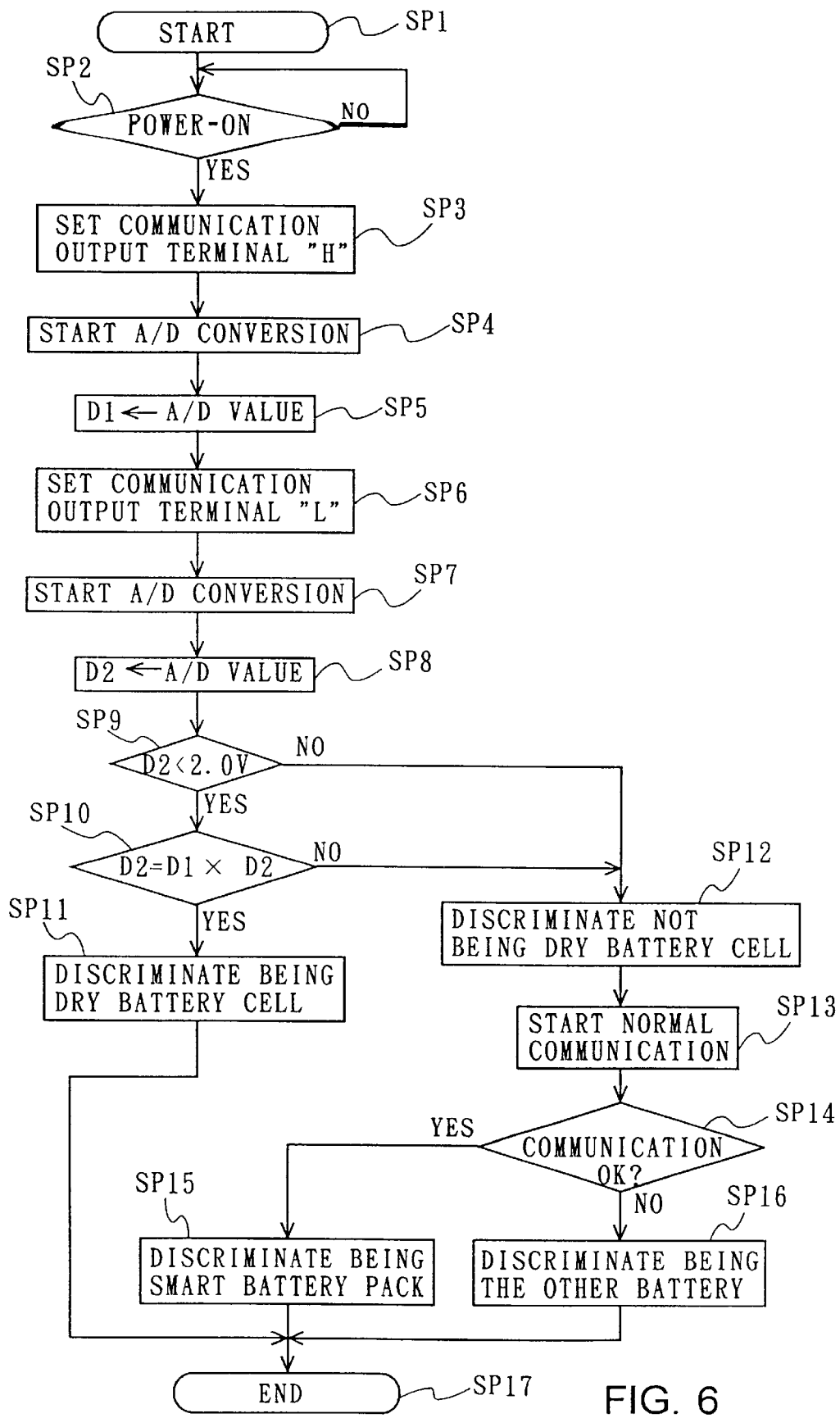
FIG. 6 is a flowchart showing the process of a power-source discriminating method according to the embodiment.

According to the above structure, a discriminating method between the dry cell battery pack 10, the smart battery pack 30, and the battery pack 40 will be described accompanying with a flowchart shown in FIG. 6. The flowchart of FIG. 6 shows the operation of the microcomputer 25 which is included in the video camera 20. First, the process is started in step SP1 and whether the power is turned on is determined (step SP2). If power ON is determined, the communication output terminal 27c is turned to a logic "H" level (step SP3). If the communication output terminal 27c is turned to the logic "H" level, the FET 26 is turned to an ON state. Here, in the case where the smart battery pack 30 is fitted to the video camera 20 (FIG. 3), the voltage value of the terminal 27b becomes almost 0 [V]. On the contrary, in the case where the dry cell battery pack 10 is fitted to the video camera 20 (FIG. 4), the voltage value of the terminal 27b become almost half value of the terminal voltage of dry cell battery (because the resistance values of the voltage-dividing resistors R2 and R3 are equal). Further, in the case where the battery pack 40 is fitted to the video camera (FIG. 5), the voltage value of the terminal 27b becomes almost 0 [V] because the resistance value of the pull-up resistor R1 is much larger than that of the voltage-dividing resistor R2.

The microcomputer 25 of the video camera 20 executes analog-to-digital (A/D) conversion function mounted therein to detect the voltage value of the terminal 27b (step SP4). Then the detected voltage value is temporarily stored as detection data D1 (step SP5).

Next, the microcomputer 25 outputs an output of a logic "L" level to the communication output terminal 27c (step SP6). If the communication output terminal 27c is tuned to the logic "L" level, the FET 26 is turned to an OFF state. In the case where the smart battery pack 30 is fitted to the video camera 20 (FIG. 3), the voltage of the terminal 27b becomes the output voltage (about 3.2 [V]) of the voltage regulator 24 due to the pull-up resistor R1. On the contrary, in the case where the dry cell battery pack 10 is fitted to the video camera 20 (FIG. 4), a voltage of the terminal 27b becomes the voltage of a terminal voltage of a dry cell battery because a resistance of the pull-up resistor R1 is very large. Furthermore, in the case where the battery pack 40 is fitted to the video camera 20 (FIG. 5), a voltage of the terminal 27b becomes the output voltage (about 3.2 [V]) of the voltage regulator 24 due to the pull-up resistor R1.

The microcomputer 25 of the video camera 20 executes A/D conversion function mounted therein to detect a voltage value of the terminal 27b (step SP7). Then the detected voltage value is temporarily stored as detection data D2 (step SP8).

Next, the microcomputer 25 performs comparison of whether the stored detection data D2 is less than 2 [V] or not (step SP9). In the case where the dry cell battery pack 10 is fitted (FIG. 4), it proceeds to step SP10 since the detection data D2 becomes the terminal voltage (about 1.5 [V]) of a piece of dry cell battery. The microcomputer 25 discriminates whether the detection data D2 is double of the detection data D1 or not (step SP10). If an affirmative result is obtained, it is determined that a dry cell battery pack is fitted (step SP11). If no affirmative result is obtained, it is determined that it is not a dry cell battery pack (step SP12). On the other hand, in the case where the smart battery pack 30 or the battery pack 40 is fitted as determined in step SP9 (FIGS. 3 and 5), the detection data D2 becomes the output voltage (about 3.2 [V]) of the voltage regulator 24 as described above, and as a result, it is determined that it is not the dry cell battery pack 10 (step SP12). If it is determined that it is not the dry cell battery pack 10 (step SP12), that is, in the case where the smart battery pack 30 is fitted, a communication is started (step SP13). And it is checked whether a normal communication can be performed or not (step SP14). If able to perform a normal communication, it is determined that it is the smart battery pack 30 (step SP15) and then the above process is terminated (step SP16). On the contrary, if a normal communication cannot be performed, it is determined that it is the battery pack 40 (step SP17).

As the above, it is so arranged as to perform discrimination between the dry cell battery pack 10 and the smart battery pack 30 by using the communication terminal 13 (33) for performing a communication between the smart battery pack 30 and the electronic device so that it can be omitted to provide a particular structure such as a push switch as a conventional one, thus limitation on electronic device design can be reduced.

Also, the embodiment can discriminate electrically between the dry cell battery pack 10 and the smart battery pack 30 without using the mechanical structure such as a push switch in a battery fitting part of the electronic device so that error-determination can be prevented.

Furthermore, the embodiment is able to structure the dry cell battery pack 10 with a simple structure which is low-impedance only adding resistor R3, thereby, low-cost can be realized.

Note that, the present invention, is not limited to the number of the cells 14 which are contained in the dry cell battery pack 10 and the number of battery cells 36 which are contained in the smart battery pack 30. Further, the aforementioned embodiments, are described with reference to the video camera 20 as an example of the electronic device; the present invention, however, is not limited to this but can also be used in a portable telephone, a portable personal computer, or the like.

As described above, according to a battery discriminating method of the present invention, in a plural type of battery packs each of which has at least, first and second terminals being positive and negative terminals and a third terminal, a predetermined voltage is supplied to the third terminal via a resistor, and the voltage value of the third terminal is detected to discriminate the type of the battery pack according to the detected voltage value; thereby, the battery can be discriminated with a simple structure. Further, it has no mechanical structure so that limitations on planning of electronic devices can be reduced. Moreover, even in the case where reduction of the size of electronic devices is aimed, discrimination error does not occur differentially from the case where a push switch is utilized.

Further, a dry cell battery pack according to the present invention is composed of a case for storing a plurality of dry batteries connected in series, positive and negative terminals which are provided in the case and connected to the poles of the series-connected dry batteries, and a resistance element of which one end is connected to a predetermined connecting point of the series-connected dry batteries and the other end is connected to a terminal provided in the case. Thereby, in a dry cell battery pack which is interchangeable with a smart battery pack, only one low-impedance resistance element is increased, thus the cost can be lowered.

Moreover, an electronic device according to the present invention comprises: in a plural type of battery packs having at least, first and second terminals corresponding to positive and negative electrodes and a third terminal, a means for supplying a predetermined voltage to the third terminal via a resistor; a means for detecting the voltage value of the third terminal; and a means for comparing the detected voltage value with a predetermined reference voltage are provided. The electronic device discriminates the type of the battery pack according to the comparison result. In addition, the terminal for communicating with a smart battery pack is used as battery discrimination so that the type of battery can be discriminated with a simple structure without increasing the number of terminals.

While the invention has been described in connection with the preferred embodiments thereof, it will be obvious to those skilled in the art that various changes and modifications may be aimed, and therefore, the appended claims cover all such changes and modifications falling within the true spirit and scope of the invention.

What is claimed is:

1. A dry battery cell pack discriminating method for discriminating if a terminal on a dry battery cell pack is used as a communication terminal or not, the dry battery cell pack having a positive electrode, a negative electrode and the terminal, said discriminating method comprising the steps of:

connecting the terminal through a predetermined resistance to the negative terminal;

detecting a first voltage on the terminal and generating first voltage data in accordance with the detected first voltage;

disconnecting the terminal from the negative terminal;

detecting a second voltage on the terminal and generating second voltage data in accordance with the detected second voltage; and communicating with the terminal on the dry battery cell pack if the second voltage data indicates that the detected second voltage is over 2.0 volts.

2. A dry battery cell pack discriminating method according to claim 1, further comprising communicating with the terminal on the dry battery cell pack if the first voltage data and the second voltage data indicate that the detected second voltage is almost twice as large as the detected first voltage.

3. A dry battery cell pack discriminating method for discriminating if a terminal on a dry battery cell pack is used as a communication terminal or not, the dry battery cell pack having a positive electrode, a negative electrode and the terminal between the positive and the negative electrode, said discriminating method comprising the steps of:

detecting a first voltage on the terminal and generating first voltage data; and communicating with the terminal if the first voltage data indicates the first voltage data is over 2.0 volts.

4. A dry battery cell pack discriminating method according to claim 3, further comprising the steps of:

connecting the terminal through a predetermined resistance to the negative terminal;

detecting a second voltage on the terminal and generating second voltage data; and communicating with the terminal if the first voltage data and the second voltage data indicate that the detected first voltage is almost twice as large as the detected second voltage.

5. A dry battery cell pack discriminating method for discriminating if a terminal on a dry battery cell pack is used as a communication terminal or not, the dry battery cell pack comprising a plurality of battery cells connected in series, a housing which accommodates the battery cells in series, a positive terminal provided on one corner of the housing for electrically connecting to a positive terminal of the battery cells in series, a negative electrode provided on another corner of the housing for electrically connecting to a negative terminal of the battery cells in series, and a communication terminal provided between the one corner and the other corner of the housing for electrically connecting through a resistance to a connection point of the battery cells in series and for outputting a predetermined voltage to indicate a type of batteries, the dry battery cell pack discriminating method comprising:

detecting a first voltage on the terminal and generating first voltage data; and communicating with the terminal if the first voltage data indicates the first voltage data is over 2.0 volts.

6. A dry battery cell pack discriminating method according to claim 5, further comprising the steps of:

connecting the terminal through a predetermined resistance to the negative terminal;

detecting a second voltage on the terminal and generating second voltage data; and communicating with the terminal if the first voltage data and the second voltage data indicate that the detected first voltage is almost twice as large as the detected second voltage.

\* \* \* \* \*